(12) United States Patent
Yankevich et al.

(10) Patent No.: US 10,237,749 B2
(45) Date of Patent: *Mar. 19, 2019

(54) DYNAMIC FREQUENCY SELECTION WITH DISCRIMINATION

(71) Applicant: Cisco Technology, Inc., San Jose, CA (US)

(72) Inventors: Evgeny Yankevich, Beachwood, OH (US); Jack Chuang, Merrimack, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,667

(22) Filed: Nov. 3, 2017

(65) Prior Publication Data

US 2018/0115909 A1    Apr. 26, 2018

Related U.S. Application Data

(63) Continuation of application No. 15/333,786, filed on Oct. 25, 2016, now Pat. No. 9,838,882.

(51) Int. Cl.
   *H04W 16/14*    (2009.01)
   *H04B 17/336*   (2015.01)
   (Continued)

(52) U.S. Cl.
   CPC .......... *H04W 16/14* (2013.01); *H04B 17/336* (2015.01); *H04K 3/226* (2013.01);
   (Continued)

(58) Field of Classification Search
   CPC ....................................................... H04W 16/14
   (Continued)

(56) References Cited

U.S. PATENT DOCUMENTS

| 8,526,388 B1 | 9/2013 | Kaukovuori et al. |
| 9,270,331 B2 | 2/2016 | Cunningham |

(Continued)

FOREIGN PATENT DOCUMENTS

WO    2014/0138645    9/2014

OTHER PUBLICATIONS

Search Report, dated Feb. 26, 2018, received in connection with EP Patent Application No. 17183614.1.

*Primary Examiner* — Michael T Vu
(74) *Attorney, Agent, or Firm* — Meunier Carlin & Curfman LLC

(57) ABSTRACT

Dynamic frequency selection (DFS) is often a requirement for a wireless local area network (WLAN) apparatus to prevent the apparatus from interfering with other systems that have a priority to a radio frequency (RF) channel. When DFS is executed, the WLAN apparatus ceases WLAN operations on the channel and searches for an open channel to resume WLAN operations. Often a WLAN apparatus misinterprets signals from another system as operating on the channel when actually the received signals are signals leaked into the channel from a system transmitting on a different channel. Presented herein are methods and apparatuses for preventing unnecessary DFS operations resulting from misinterpreted signals through the use of a signal to noise ratio determined from a pulse spectral density of the received signal.

20 Claims, 8 Drawing Sheets

(51) Int. Cl.
*H04K 3/00* (2006.01)
*H04W 84/12* (2009.01)

(52) U.S. Cl.
CPC ......... *H04K 3/822* (2013.01); *H04K 2203/18* (2013.01); *H04W 84/12* (2013.01)

(58) Field of Classification Search
USPC .................................................. 455/446–449
See application file for complete search history.

(56) References Cited

U.S. PATENT DOCUMENTS

| | | | |
|---|---|---|---|
| 9,807,646 B1 * | 10/2017 | Jorgavanovic | .......... H04L 47/29 |
| 2006/0252418 A1 | 11/2006 | Quinn et al. | |
| 2007/0077892 A1 | 4/2007 | Muquet | |
| 2013/0128927 A1 | 5/2013 | Yucek et al. | |
| 2016/0066199 A1 * | 3/2016 | Yeddala | ................ H04W 24/02 |
| | | | 370/230 |

\* cited by examiner

ON-CHANNEL

OFF-CHANNEL

DYNAMIC FREQUENCY SELECTION WITH DISCRIMINATION

CROSS-REFERENCE TO RELATED APPLICATION

The present application is a continuation of U.S. patent application Ser. No. 15/333,786, filed on Oct. 25, 2016, which is hereby incorporated by reference in its entirety.

TECHNICAL FIELD

The present disclosure relates to dynamic frequency selection (DFS) that prevents wireless network traffic from interfering with other wireless traffic on a shared radio-frequency (RF) band.

BACKGROUND

The radiofrequency (RF) spectrum is a finite resource. As the number of operators (i.e., users) and applications have grown, some RF bands, such as the Unlicensed National Information Infrastructure band (i.e., UNIT band) or the Industrial, Scientific, and Medical band (i.e., ISM band) have been co-allocated for a variety of applications and users. To prevent interference among the different applications, certain devices are required to monitor co-allocated band channels and to take action when interference is detected. In the United States, for example, wireless local area network (i.e., WLAN) devices (e.g., 802.11 a/h devices) may operate in a 5 GHz band, which was traditionally allocated for use by radar (e.g., weather radar), but must tune to a different channel when interference is detected. This interference avoidance process is referred to a Dynamic Frequency Selection (DFS).

Conventional DFS operations cause a wireless access point device operating in a given channel to switch to another channel when a potential for interference (e.g., the presence of a radar signal) is detected. Typically, a wireless device (e.g., wireless access point) running DFS continuously monitors (i.e., both prior to and during channel use) the channel of use (i.e., the service channel) for the presence of a radar signal. Once detected, the device vacates and/or flags the channel as unavailable. Vacating a channel and relocating to a new channel is disruptive to communication and can result in the device having to broadcast a channel switch announcement, disassociate with existing client devices, search for a new channel, switch to the new channel, and accept to new client associations.

Because radars typically transmit at high powers (e.g., between 250 kilowatts and 1 megawatt), a radar may leak signals (e.g., intermodulation products) into the service channel even when the radar is operating on a different channel. This situation may cause a false DFS detection. This false DFS detection may unnecessarily trigger the wireless device to tune to another operating frequency or channel. In addition, false DFS detection (i.e., DFS falsing) can limit the number of available channels when a device is searching for open channels.

In certain circumstances, it is desired that signals resulting from radars operating on-channel be distinguished from signals resulting from radars operating off-channel to reduce or eliminate unnecessary DFS operations.

DESCRIPTION OF EXAMPLE EMBODIMENTS

Overview

Figure 1:
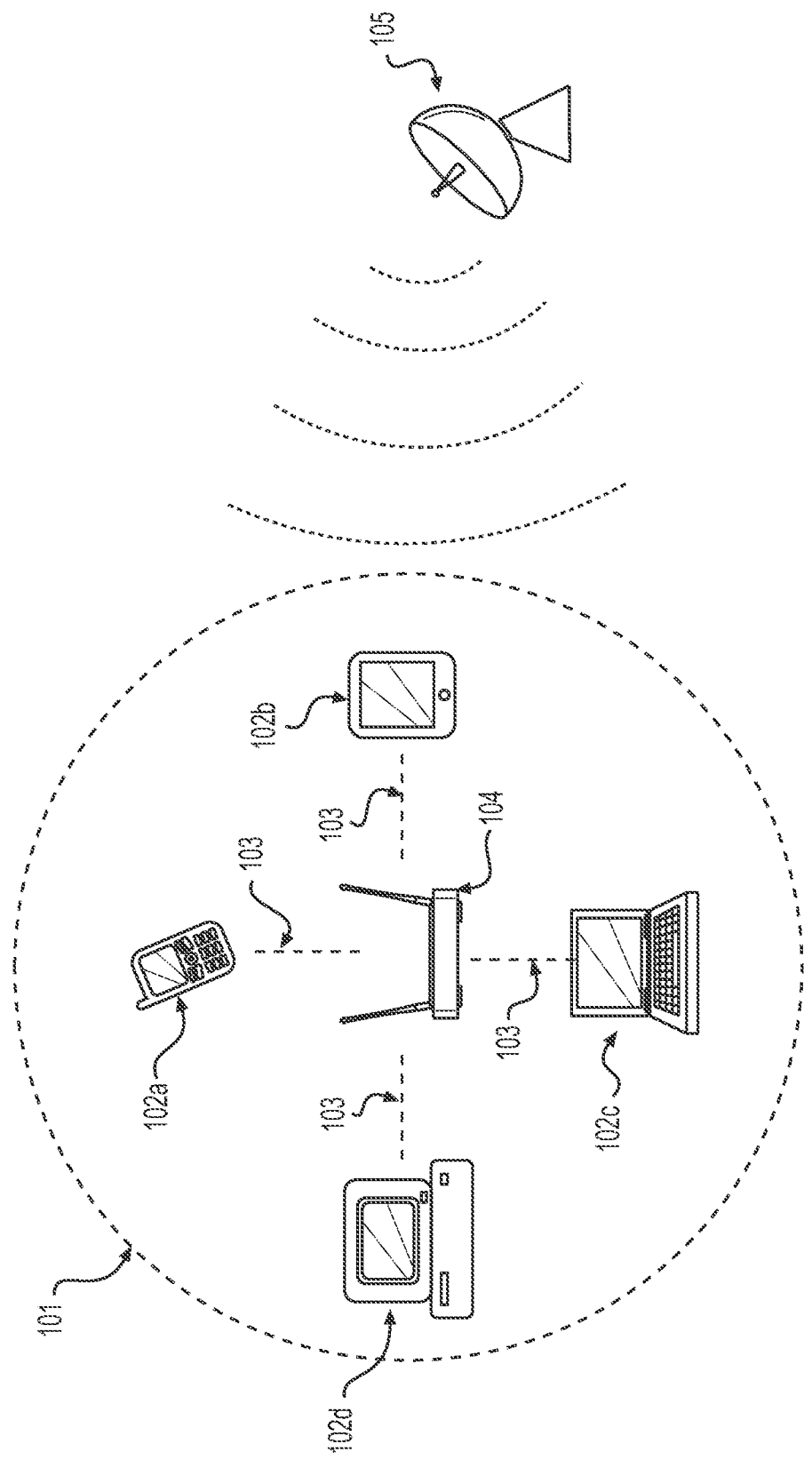
FIG. 1 is a diagram illustrating an example WLAN network and a radar that must not be interfered with according to an embodiment of the present disclosure.

Presented herein is a wireless device (e.g., wireless local area network (WLAN) apparatus, wireless access point, etc.) that is configured to discriminate between interfering sources that are operating on the service channel (i.e., on-channel) and interfering sources that are operating on a different channel (i.e., off-channel) but leaking energy into the service channel.

Such discrimination facilitates the wireless device in reducing false positives from, for example, a radar operating in-band but off-channel, which otherwise causes dynamic frequency selection operations (DFS) to occur, thereby preventing such unnecessary dynamic frequency selection (DFS) operations. Because DFS operations disrupts communication, the reduction of unnecessary DFS operations (i.e., due to false positive triggers) can improve network traffic throughput and wireless device uptime.

In an aspect, a method is disclosed for preventing a wireless access point (WAP) device from performing unnecessary dynamic frequency selection (DFS). The method includes receiving (i.e., by a processor) a radio-frequency (RF) signal on a first channel of the WAP; determining, by the processor, a signal-to-noise ratio (SNR) of a frequency spectrum derived from a portion of the received RF signal; comparing, by the processor, the SNR to an on-channel threshold associated with the first channel, wherein the SNR does not exceed the expected on-channel threshold for a received RF signal transmitted by an RF source operating on a second channel different from the first channel; and in response to the comparison, preventing the WAP, operating in the first channel, from performing a DFS operation that causes the wireless access point device to tune to another channel.

In some embodiments, the SNR is determined by identifying (i.e., by the processor) a pulse within the portion of the received RF signal; computing (i.e., by the processor) a power spectral density (PSD) of the pulse; and determining the SNR of the PSD, wherein the SNR is determined by relating (i) a signal portion of the PSD and (ii) a noise portion of the PSD that does not overlap with the first signal portion.

In some embodiments, the signal portion of the PSD contains a center frequency (Fc), wherein Fc is determined by estimating the frequency of the pulse.

In some embodiments, the signal portion of the PSD corresponds to the signal occupied bandwidth (BW) of the pulse, wherein the BW is determined by estimated the duration of the pulse.

In some embodiments, the operation of computing a PSD of the pulse includes computing the Fast Fourier Transform (FFT) of the pulse, wherein the FFT is comprised of FFT-bins.

In some embodiments, the operation of determining the SNR comprises determining (i) an FFT-bin corresponding to an estimated center frequency (Fc) of the pulse, and (ii) the number of FFT-bins within an estimated signal occupied bandwidth (BW) of the pulse. Then, using the FFT-bin corresponding to Fc and the number of FFT-bins within the BW, the FFT-bins corresponding to the signal portion of the PSD and the FFT-bins corresponding to the noise portion of the PSD are determined. Next, a signal power is determined using the FFT-bins in the signal portion and a noise power is determined using the FFT-bins in the noise portion. Finally, the SNR is determined as the ratio of the signal power to the noise power.

In some embodiments, the FFT-bin that corresponds to Fc is at the center of the FFT-bins corresponding to the signal portion of the PSD.

In some embodiments, the signal portion of the PSD spans the number of the FFT-bins within the BW of the pulse.

In some embodiments, determining a signal power using the FFT-bins in the signal portion comprises summing the FFT-bins in the signal portion of the PSD, while determining a noise power using the FFT-bins in the noise portion comprises summing the FFT-bins in the noise portion of the PSD.

In some embodiments, the method further comprises the operation of retrieving, the on-channel threshold from a look-up table, wherein the look-up table comprises a plurality of on-channel thresholds each indexed by a given center frequency and/or a given signal-occupied bandwidth.

In some embodiments, the method further comprises the operations of comparing (i.e., by a processor) the SNR to an on-channel threshold associated with the first channel and if the SNR exceed the on-channel threshold, then causing the WAP, operating on the first channel, to perform a DFS operation, which causes the WAP to tune to another channel.

In another aspect, a wireless device (e.g., a local area network (WLAN) apparatus), is disclosed. The wireless device includes an antenna subsystem tuned to a radio-frequency (RF) band; a transceiver subsystem connected to the antenna subsystem and configured to transmit and receive on a first channel, wherein the first channel is one of a plurality of channels in the RF band; and a processor communicatively coupled to the transceiver subsystem and configured by instructions (e.g., program code stored in memory of the wireless device) to receive a signal from the transceiver subsystem and analyze a portion of the signal to determine whether the portion of the signal is a pulse from a radar transmitting on the first channel or is noise from a radar transmitting on a channel other than the first channel. The analysis of the portion of the signal includes estimating a center frequency (Fc) of the portion of the signal; determining a power spectral density (PSD) of the portion of the signal; calculating a signal-to-noise ratio (SNR) of the power spectral density; comparing the SNR of the power spectral density to an on-channel threshold; and performing or not performing a dynamic frequency operation to tune the transceiver to a second channel in the RF band based on the comparison of the SNR to the on-channel threshold.

In some embodiments, if the SNR of the PSD exceeds the on-channel threshold, the method includes performing the DFS operation that tunes the transceiver subsystem to another channel (i.e., a second channel) in the RF band; otherwise, the method includes remaining on the first channel.

In some embodiments, the noise is a pulse with nonlinear distortion from a radar transmitting on a channel other than the first channel.

In some embodiments, the instructions to determine the PSD of the portion of the signal comprises instructions that cause the processor to compute a Fast-Fourier transform (FFT) of the portion of the signal, wherein the Fast-Fourier transform is comprised of FFT-bins.

In some embodiments, the instructions to calculate the SNR of the PSD, comprises instructions to (i) determine a signal region of the PSD, wherein the signal region is centered at Fc and spans a signal-occupied bandwidth (BW); (ii) determine one or more noise regions of the PSD, wherein the one or more noise regions are regions in of the PSD not in the signal region; (iii) compute a signal power from the signal region and a noise power form the one or more noise regions; and (iv) calculate the SNR as the ration of the signal power to the noise power.

In another aspect, a wireless local-area network apparatus is disclosed. The apparatus comprising: a (tunable) transceiver subsystem that is tuned to a channel selected from a plurality of channels (e.g., in a band); a processor operatively coupled to the transceiver subsystem; and a memory having instructions (e.g., software) stored thereon. The instructions, when executed by the processor, cause the processor to determine if a signal received by the transceiver is (i) from a radar transmitting on the channel or (ii) from a radar transmitting on a different channel and based on the determining adjusting the operation of the WLAN's dynamic frequency selection (DFS).

In some embodiments, upon determining that the signal is received from a radar transmitting on the channel, the DFS operates by searching for an open channel and tuning the transceiver to the open channel.

In some embodiments, upon determining that the signal is received from a radar transmitting on a different channel, the DFS operates by remaining on the channel.

It is understood that throughout this specification the identifiers "first", "second", "third", "fourth", "fifth", "sixth", and such, are used solely to aid in distinguishing the various components and steps of the disclosed subject matter. The identifiers "first", "second", "third", "fourth", "fifth", "sixth", and such, are not intended to imply any particular order, sequence, amount, preference, or importance to the components or steps modified by these terms.

Example Embodiment

FIG. 1 graphically illustrates an example WLAN 101 that includes a network WLAN apparatus 104 (e.g., a wireless access point) that is configured with a discrimination operation as disclosed herein. As shown, the WLAN 101 includes a plurality of client wireless devices 102 (shown as mobile devices 102a, tablets 102b, laptops 102c, desktop computers 102d, etc., that form communication links 103 with the network WLAN apparatus 104. During operation, while the network WAP device 104 transmits information to, and receives information from, the client WLAN devices 101, the network WAP device 104 is configured to monitor on-channel signals to detect presence of a radar signal (e.g., pulse) from a radar 105. Examples of such monitoring operations are described in wireless protocols, such as specified by IEEE 802.11a, 802.11n, 802.11ac, etc.

According to the protocols, in the United States and certain countries, a WAP may operate (i.e., transmit/receive) in some bands (e.g., 5 GHz) provided that the WAP does not interfere with other users 105 (e.g., users with band priority) that also operate in this band (shown as radar 105). To avoid interference with users 105 (e.g., radar) operating on the same channel, the WAP device 104 is configured for dynamic frequency selection (DFS). DFS operation is illustrated in FIGS. 2A and 2B.

Figure 2A:
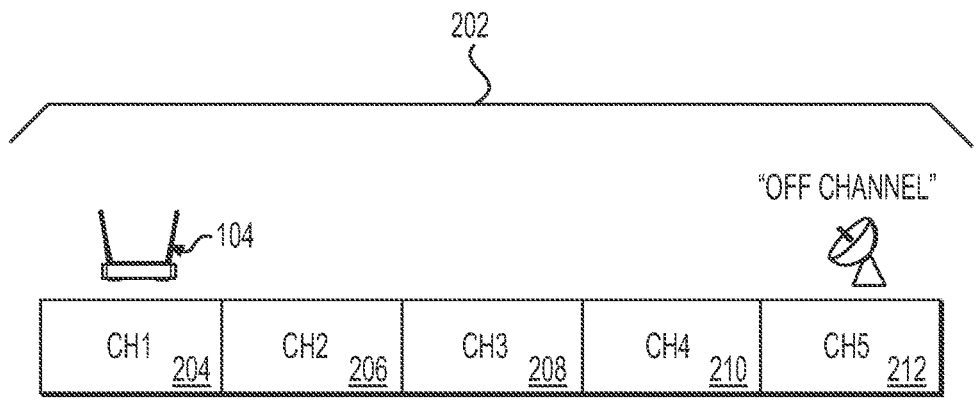
FIG. 2A graphically illustrates an RF band having channels according to an embodiment of the present disclosure.
Figure 2B:
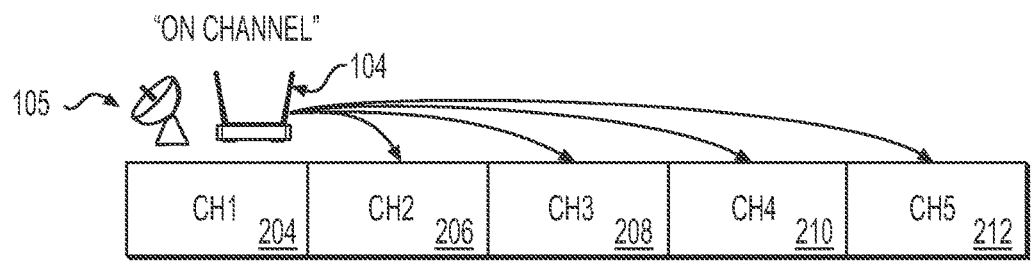
FIG. 2B graphically illustrates DFS that results from an on-channel source (e.g., radar) according to an embodiment of the present disclosure.

FIGS. 2A and 2B illustrate example operations of dynamic frequency selection (DFS) at a WLAN device in a local area network. As shown in FIG. 2A, an exemplary band 202 of a WAP device 104 includes a plurality of channels (shown as channel "CH1 204", channel "CH2 206", channel "CH3 208", channel "CH4 210", and channel "CH5 212", though any number of channels may be employed). During operation, the WAP device 104 may operate on (i.e., within) one of these channels. As shown in this example and in FIG. 2A, the WLAN device 104 is operating on channel CH1 204 and monitoring for a radar signal therein.

As shown in FIG. 2A, a radar device 105 operating on channel CH5 212 causes no DFS operation, because no radar signal is detected on channel CH1 201. As a result, the WLAN device 104 continues to operate on CH1 201.

Upon detecting that a radar 105 is operating on CH1 201, as shown in FIG. 2B, the WLAN device 104 is configured, via DFS, to search for a new and open channel in the band 202 on which to operate. In some embodiments, the search may include monitoring (e.g., for a period) one or more other channels in the band (e.g., CH2 204, CH3 206, CH4 208, and CH5 208) for signals from other devices. Once an open channel is found within the band 202, the WLAN device 104, in some embodiments, broadcasts a move announcement to client devices 102 connected to the WLAN device 104. The move announcement triggers the client devices 102 to move from the current channel (namely, CH1 204) to an open channel specified in the move announcement (e.g., one of channels CH2 206 to CH5 212 as shown in FIG. 2B). The WLAN device 104, in some embodiments, then disconnects the wireless links 103 with the client devices 102 on channel CH1 204 and reestablishes the wireless links 103 with the client devices 102 on the new channel.

Figure 2C:
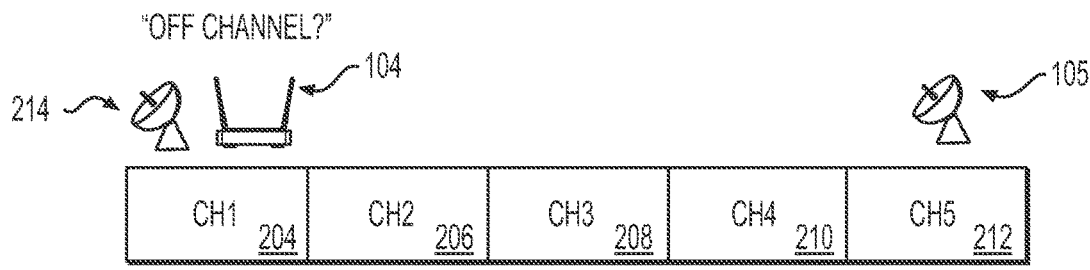
FIG. 2C graphically illustrates prevention of DFS falsing that results from an off-channel source (e.g., radar) leaking signals into the service channel according to an embodiment of the present disclosure.

In some circumstances, signals detected by the WLAN device 104 are falsely interpreted as originating from a radar source operating on the same channel (i.e., on-channel) and DFS operations are carried out unnecessarily (i.e., DFS falsing). Radars, for example, transmit at very high powers (e.g., 250 KW-1 MW) and despite filtering, may "leak" spurious signals (e.g., intermodulation products) into other channels, as shown in FIG. 2C. Specifically, FIG. 2C graphically illustrates prevention of DFS falsing that results from an off-channel source (e.g., radar) leaking signals into the service channel. The power of these leakage signals may be significant, especially when a receiver is proximate to the radar. As shown in FIG. 2C, an alias (i.e., ghost, false, etc.) radar 214 appears to be operating on CH1 204 because the spurious signals resemble the signals from a radar operating on-channel.

As shown in FIG. 2C, a WLAN device 104 with DFS discrimination operating on channel CH1 204 detects spurious signals (e.g., intermodulation products) from a radar operating on CH5 212 but continues to operate on channel CH1 204 without executing a DFS operation to tune the WLAN device to another channel due to its ability to determine that the signal received is from an off-channel radar 105.

It should be appreciated by one skilled in the art that the prevention of unnecessary DFS operation due to DFS falsing improves the throughput of the communication link 103 by eliminating unnecessary communication disruptions as well as effectively increasing the number of available channels in the band 202 to the WLAN device that would have become unavailable due to the false (i.e., alias, ghost, etc.) radar 214 that is presumed to be operating on CH1 204.

Figure 3A:
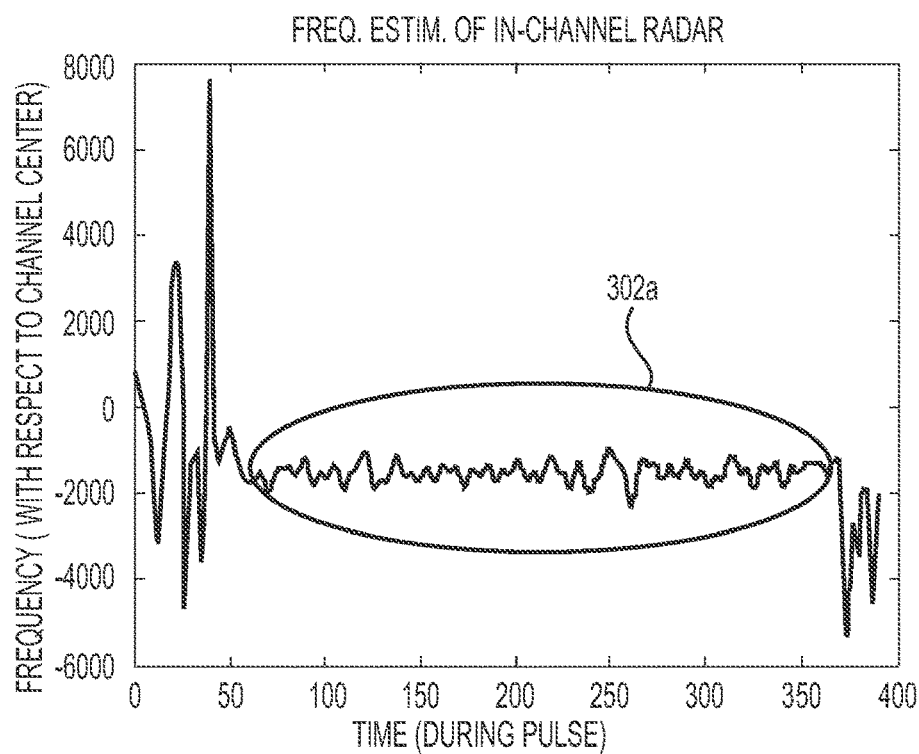
FIGS. 3A and 3B graphically depict exemplary on-channel (FIG. 3A) and off-channel (FIG. 3B) frequency estimation results according to an embodiment of the present disclosure.
Figure 3B:
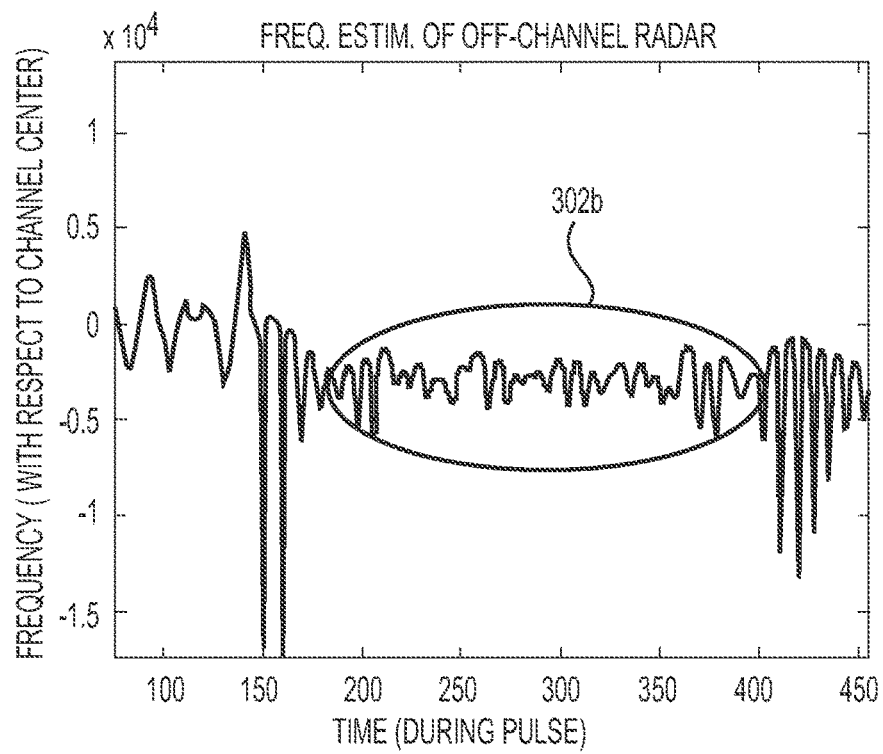

Determining DFS falsing is complex because spurious signals (e.g., intermodulation products) associated with an off-channel radar may appear very similar to corresponding on-channel signals. For example, spurious signals from an off-channel radar may have the same pulse width and pulse repetition rate as corresponding on-channel signals. In addition, it is also observed that the strength of a received pulse may vary due to the distance that the signal has propagated before being received by the WLAN device. For example, the signal strength of spurious (i.e., leakage) pulses from radar at a first range (e.g., nearby) may be comparable to the signal strength of on-channel pulses from a radar at a second range (e.g., distant). In addition, it is observed that pulses that are intermodulation products of an off-channel radar may have estimated center frequencies that appear stable. This stability is shown in FIGS. 3A and 3B. Specifically, FIGS. 3A and 3B illustrate frequency estimates (i.e., relative to the center frequency of the channel) of signals in a channel as shown over time (i.e., during a pulse). FIG. 3A shows the estimated frequency of a signal from a radar signal that is on-channel (i.e., one that should cause DFS to occur), and FIG. 3B shows the estimated frequency of a signal from a radar signal that is off-channel (i.e., one that may cause DFS falsing and where DFS should not occur). As shown in each of FIGS. 3A and 3B, the variation of the estimated frequency for on-channel and off-channel signals (i.e., shown within circled regions 302a and 302b) are similar.

Figure 4:
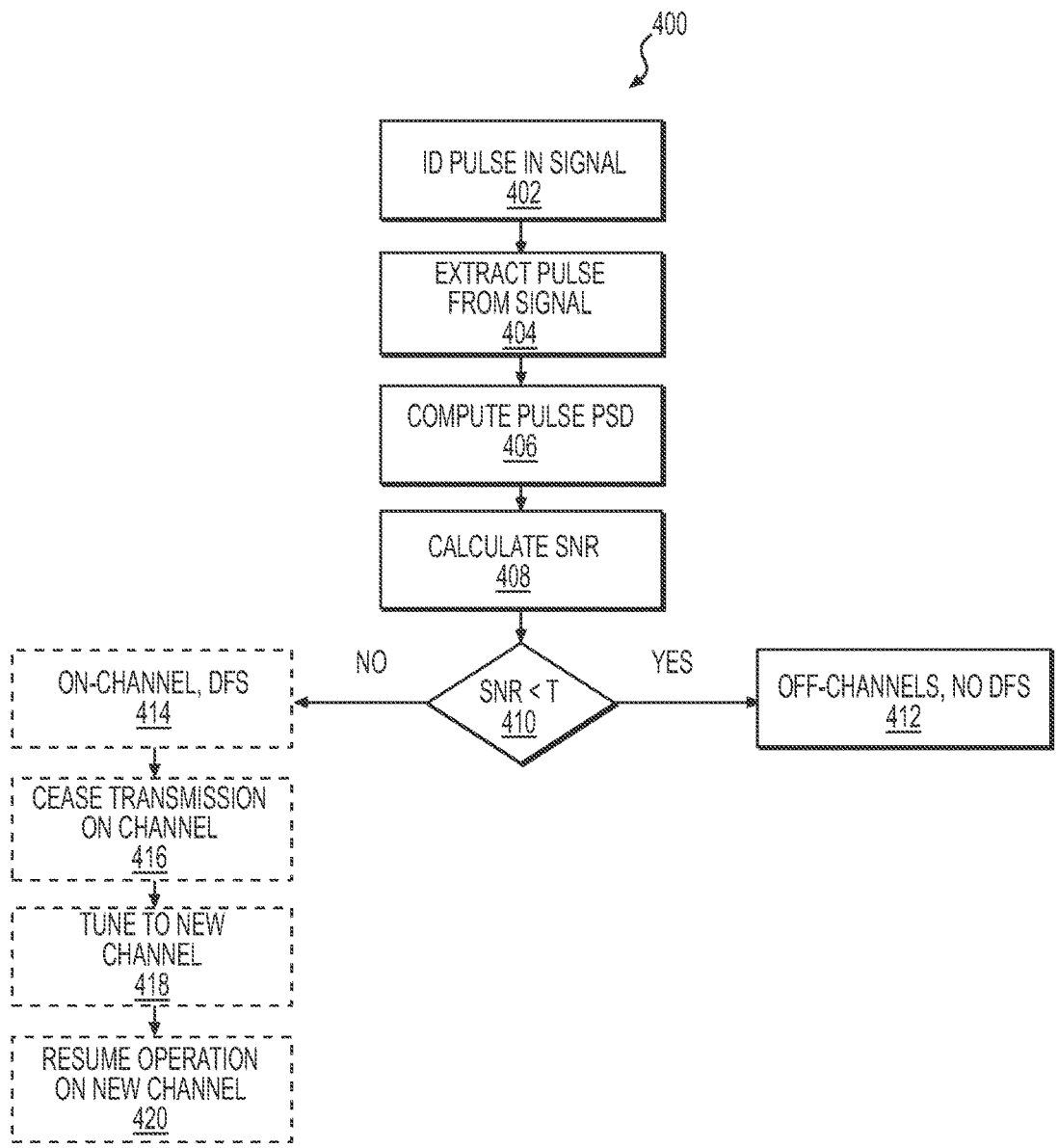
FIG. 4 is a flow diagram for a method for preventing a wireless access point (WAP) from performing unnecessary dynamic frequency selection (DFS) according to an embodiment of the present invention.

FIG. 4 is a flow diagram for an example method for preventing DFS falsing by a wireless access point (WAP) thereby preventing the WAP from performing unnecessary dynamic frequency selection (DFS) according to an embodiment of the present invention.

As shown in FIG. 4, the method 400, in some embodiments, begins with identifying a pulse in a signal received by a WAP that is tuned to a given channel (step 402). The pulse, in some embodiments, is extracted from the signal (step 404) and processed (e.g., sampled) to compute the pulse's power spectral density (PSD) (step 406). The signal to noise ratio (SNR) of the PSD is then calculated (step 408), and compared to an on-channel threshold (shown as "T") (step 410). If the SNR is below the on-channel threshold then the device, in some embodiments, concludes that the pulse is likely from a source operating off-channel. As a result, DFS is not performed 412. In some embodiments, if the SNR is above the on-channel threshold, then it is concluded that the pulse is likely from a source operating on-channel 414 and as a result, DFS is performed 414. DFS may include the operations of ceasing transmission on a channel (i.e., the interfering channel) 416, tuning to the WAP to a new channel 418, and resuming transmitting/receiving (i.e., WAP operations) on the new channel 420.

The identification of the pulse may include differentiating the pulse from other received signals. For example, a pulse may have a unique power, pulse width, pulse repetition frequency (PRF) that sets it apart from other signals. A received signal may processed to detect these unique features and a portion of the signal containing the unique features (i.e., the pulse) may extracted. The portion of the signal may also be analyzed to determine the pulse's duration (Td) and the pulse's center frequency (Fc), which may further aid in extraction and/or characterization, as will be described in more detail below.

The extracted pulse typically includes a sequence of samples. To compute the PSD, a mathematical transformation is performed on the sequence of samples. For example, a fast Fourier transform (FFT) may be used to compute the discrete Fourier transform of the sequence (i.e., to transform the pulse). The PSD that results from FFT is a finite sequence of equally-spaced FFT-bins that (i) are distributed over a frequency range corresponding the sampling frequency of the pulse and (ii) collectively describe the distribution of the pulse's power versus frequency. The length of the FFT corresponds to the number of FFT-bins (i.e., PSD resolution). The FFT length may vary and is typically chosen of sufficient length (e.g., 128) to discern the features (e.g., peaks, nulls, etc.) of the pulse, but not so long as to be computationally expensive (i.e., uses computational resources without providing more information).

Figure 5A:
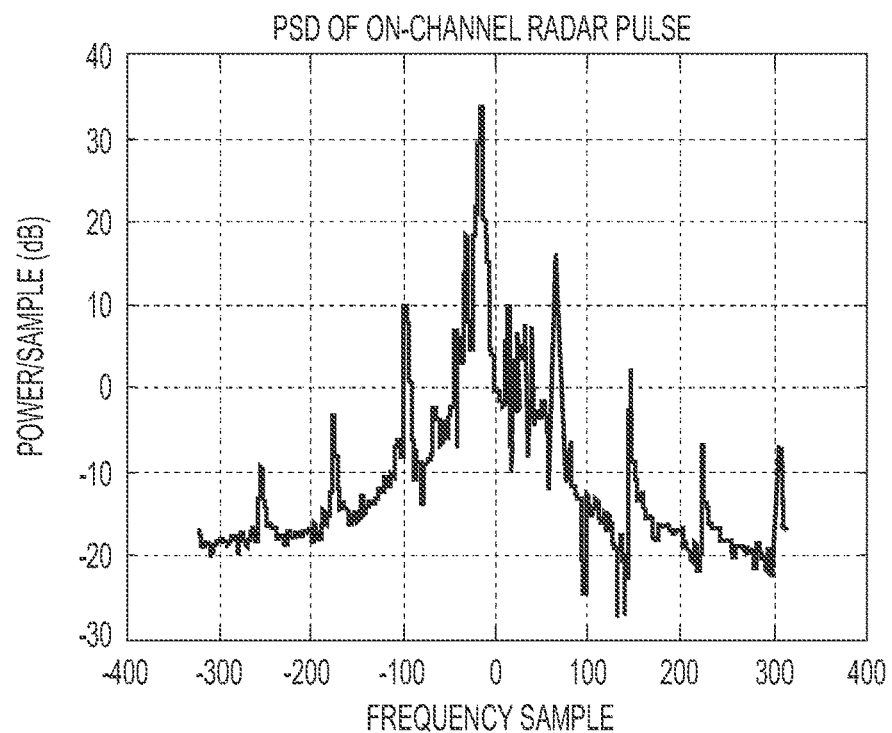
FIGS. 5A and 5B graphically depict the calculated power spectrum densities (PSDs) of measured pulses from on-channel and off-channel radars.
Figure 5B:
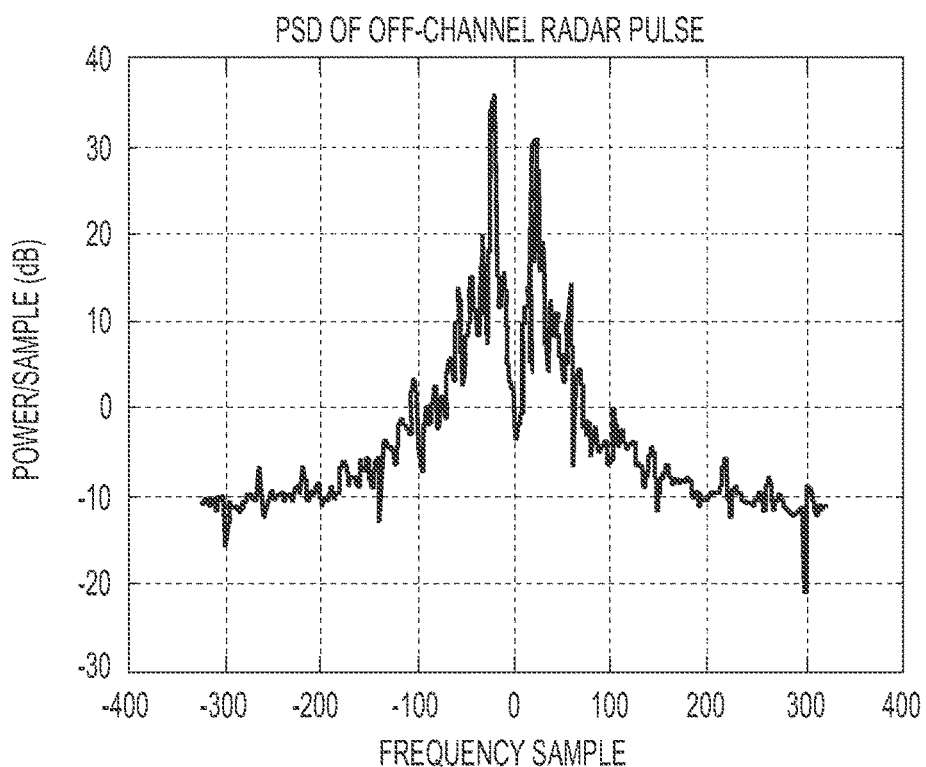

FIGS. 5A and 5B illustrate the calculated PDS's of measured pulses from on-channel and off-channel radars. As shown in FIGS. 5A and 5B the main lobe power levels of the PSD from on-channel and off-channel sources can be comparable because of automatic gain control (AGC), which is often present in receivers. As a result, discriminating between pulses from on-channel and off-channel sources generally requires an analysis of the PSD's features.

Figure 6A:
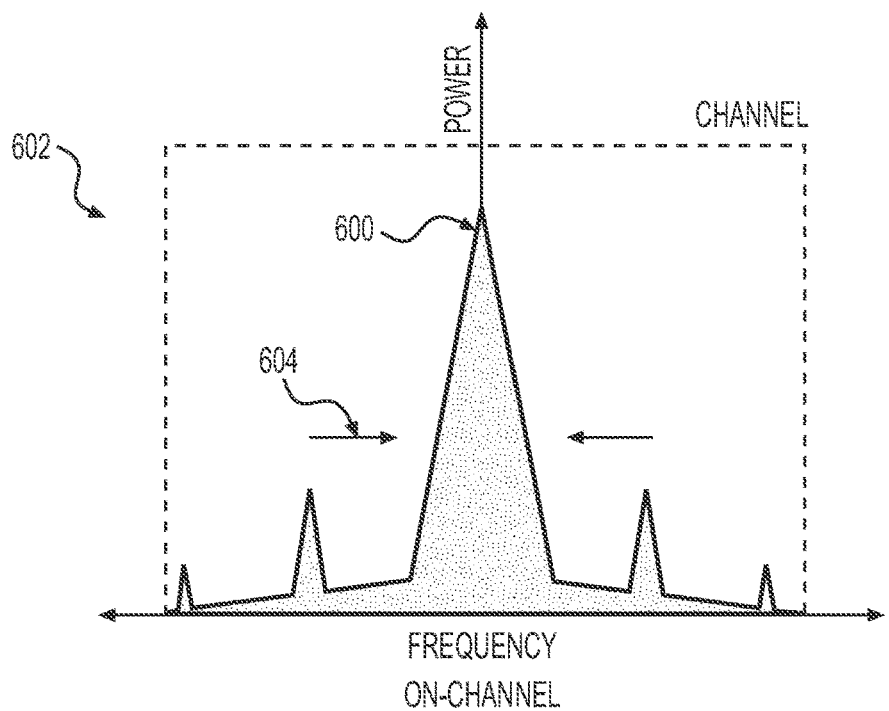
FIGS. 6A and 6B graphically illustrate power spectrum density plots of a pulse from an on-channel source (FIG. 4A) and from an off-channel source (FIG. 4B) according to an embodiment of the present disclosure.

FIG. 6A illustrates the features (e.g., peaks, nulls, bandwidth, overall shape, etc.) of a typical PSD (i.e., spectrum) for a pulse from an on-channel radar. The individual FFT-bins are not shown, but one having skill in the art will recognize that the PSD shown is technically comprised of a sequence of FFT-bins, as described previously. As a result, the PSD's vertical axis corresponds with the power (e.g., squared amplitude) of each frequency component (i.e., each FFT-bin), while the PSD's horizontal axis corresponds to frequency. The PSD of an on-channel pulse typically has a peak 600 at the pulse's center frequency (Fc). As a reference, the operating channel 602 is shown in FIG. 6A (and FIG. 6B). It should be noted that in typical operation, the center frequency of the pulse may not be aligned with the center frequency of the channel and the signal occupied bandwidth (i.e., bandwidth) of the pulse 604 may only comprise a portion of the total channel bandwidth. Further, the pulse's bandwidth 604 may be measured in a variety of ways (e.g., 3 dB bandwidth, null-to-null bandwidth etc.). In addition, the pulse's bandwidth (i.e., the signal occupied bandwidth) typically corresponds to the pulse's duration (i.e., pulse width).

Figure 6B:
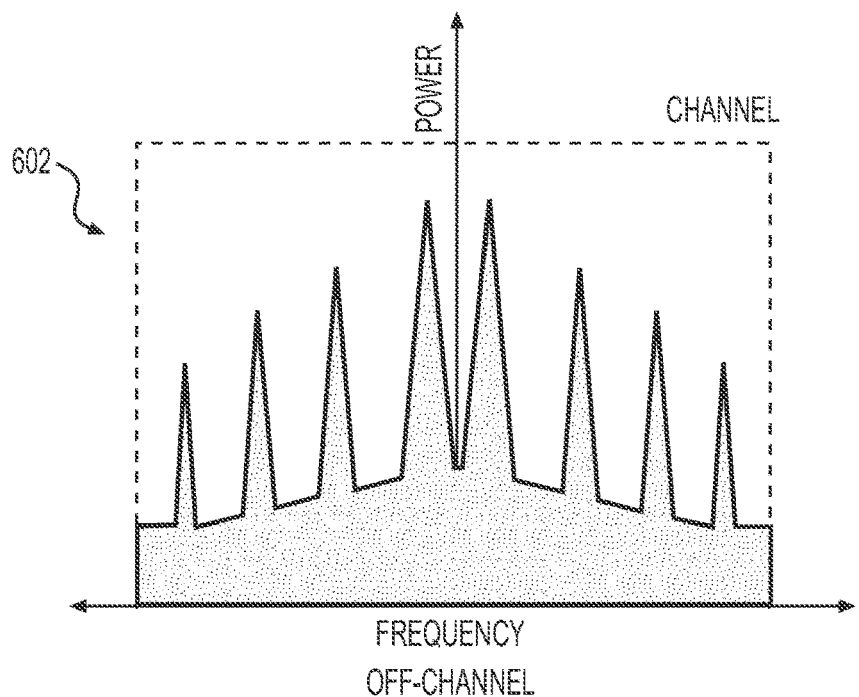

FIG. 6B illustrates a PSD typical of an unintentional signal leaked into the service channel 602 from a source operating off-channel. These signals (i.e., noise from the WAP's perspective) may be harmonics, intermodulation products, or other unintentional signals. Intermodulation products (i.e., intermodulation, intermods), for example, are nonlinear distortions of signals when the signals are passed through a nonlinear system. The nonlinear system may be an active device driven into nonlinearity (e.g., amplifier) or a normally nonlinear device (e.g., a mixer). In addition, passive circuits (e.g., loose and/or corroded connectors), may also operate as nonlinear radiators in certain circumstances. Radar systems are especially prone to nonlinearities resulting in intermodulation products due to the high powers that they transmit.

In contrast to FIG. 6A, the PSD from an off-channel source, shown in FIG. 6B, has a different spectrum. The differences include (but are not limited to) the number of peaks, the number of nulls, the peak spacing, the center frequency, the signal occupied bandwidth, the amplitude variation of peaks, the noise floor, and the overall shape (e.g., the shape of an envelope drawn from peak to peak). For example, the estimated center frequency of the off-channel pulse may appear between peaks in the PSD. These differences are due, for example, to the nonlinearities inherent with intermodulation. Detection of these differences facilitates the classification of a received pulse as either from an on-channel source (i.e., on-channel pulse) or from an off-channel source (i.e., off-channel pulse).

To discriminate between on-channel and off-channel pulses, the example method described previously embraces calculating a signal-to-noise ratio (SNR) of the PSD. The SNR provides a measure of the pulse's nonlinear distortion. This measurement may then be compared to a threshold to determine if the source of the pulse (i.e., the radar) is operating on-channel or off-channel. If the radar is operating on-channel, then the WAP may perform operations to vacate the channel in order to comply with federal or local regulations regarding spectrum use.

Computation of the SNR may be accomplished using operations to mathematically process a PSD obtained from a FFT of an extracted pulse. To start, the FFT-bin that corresponds with Fc (found through frequency estimation) may be determined. In addition, the number of FFT-bins corresponding to the signal occupied bandwidth (BW) may be determined using the FFT length and the estimated pulse duration (Td) (e.g., found during pulse extraction). With this information, the FFT-bins corresponding to a signal region may be obtained. For example, if Ns is the number of bins corresponding to the BW, and N_Fc is the FFT bin corresponding to the estimated center frequency, then the signal region may include the FFT-bins in the range of N_Fc-Ns to N_Fc+Nc.

The FFT-bins corresponding to the BW comprise the signal region of the FFT, while the other FFT-bins comprise the noise region of the FFT. As a result, the PSD may be divided into a signal region and one or more noise regions based. The division described may include assigning each FFT-bin (i.e., bin) in the BW as a signal bin and assigning each bin in not in the BW as a noise bin. Alternatively, the groups may be formed from bins (i.e., samples) in the signal regions and noise region(s) respectively. Next, a signal power is computed from the signal region (i.e., from the values of the FFT-bins in the signal region) and a noise power is computed from the one or more noise regions (i.e., from the values of the FFT-bins in these one or more noise regions).

Computing a power (e.g., signal power, noise power) from a region may comprise summing the values of the bins in the region. In other words, an integration of the spectral components over a frequency range yields the total power in the frequency range. Variations in the computation of power exist. For example, the square of each FFT-bin value may be computed prior to summation. In another example, the average power may be computed for the frequency range (i.e., summation of FFT-bins divided by number of FFT-bins). All variations of computing and representing the power of a signal region and a noise region are embraced by the present disclosure. After the power of the signal region and the noise region (or regions) is computed, the SNR may be calculated as the ratio of the signal power to the noise power.

Figure 7A:
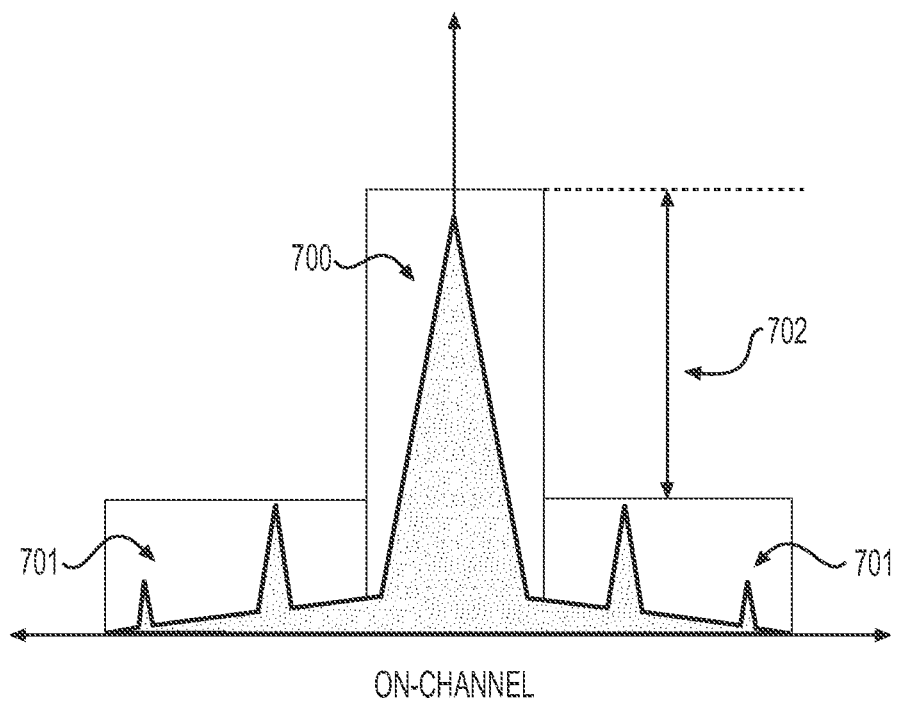
FIGS. 7A and 7B graphically illustrate signal regions and noise regions in PSD plots for a pulse from an on-channel source (FIG. 5A) and from an off-channel source (FIG. 5B) according to an embodiment of the present disclosure.
Figure 7B:
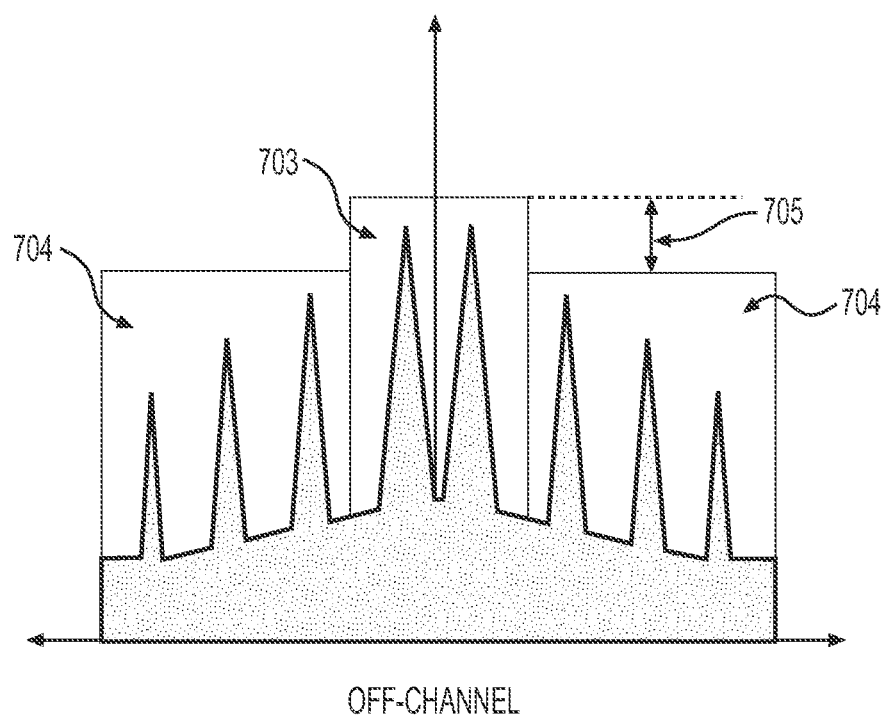

FIGS. 7A and 7B visually illustrate the SNR calculation process for the on-channel and off-channel PSDs described previously (i.e., FIGS. 6A and 6B). The PSD for an on-channel pulse is illustrated in FIG. 7A. The signal region 700, in FIG. 7A, is the region containing the primary peak (i.e., main lobe). For the exemplary PSD shown in FIG. 7A the signal region extends to nulls on either side of the main peak. The noise regions 701 contain noise and/or secondary peaks not contained in the signal region. To illustrate the power in the signal region 700 compared to the power in the noise regions 701, the amplitude of the boxes highlighting the regions are drawn to contain the peaks in each region. This illustration is for discussion purposes; the actual power may vary for each region in practical implementations. The difference 702 between the signal region and the noise regions (i.e., shown in FIG. 7A) is illustrative of the SNR for the on-channel PSD. FIG. 7B illustrates corresponding signal regions 703 and noise regions 704 for an off-channel PSD. As shown, the difference 705 between the signal region 703 and the noise regions 704 is illustrative of the SNR for the off-channel PSD. As illustrated by FIGS. 7A and 7B, the on-channel SNR 702 is greater than the off-channel SNR 705.

An on-channel threshold may be created so that pulses having PSD SNRs that exceed the on-channel threshold determined to be from a radar transmitting on the operating channel, while pulses having PSD SNRs that fail to exceed the on-channel threshold are determined to be from a radar transmitting on a different channel (and are leaking signal into the channel). This determination may, in turn, facilitate the WAP taking steps adjust the DFS (i.e., to respond to the pulse by moving operations to an open channel or to ignore the pulse and remain operating on the channel).

The on-channel threshold may be created from test data for a particular radar. For example, a plurality of on-channel thresholds may be determined from a plurality of radars. These thresholds may be stored in a look-up table (LUT) and indexed by characteristics of the radar (e.g., Fc, Td, PRF, etc.) so that the operation of obtaining an on-channel threshold (e.g., from a stored look-up table) occurs before the on/off channel determination. For example, a pulse may be received and the pulse frequency (Fc), pulse duration (Td), and bandwidth (BW) may be estimated. The LUT may be queried using Fc and Td to obtain an on-channel threshold corresponding to a radar operating with one or more of these characteristics.

Example Device

Figure 8:
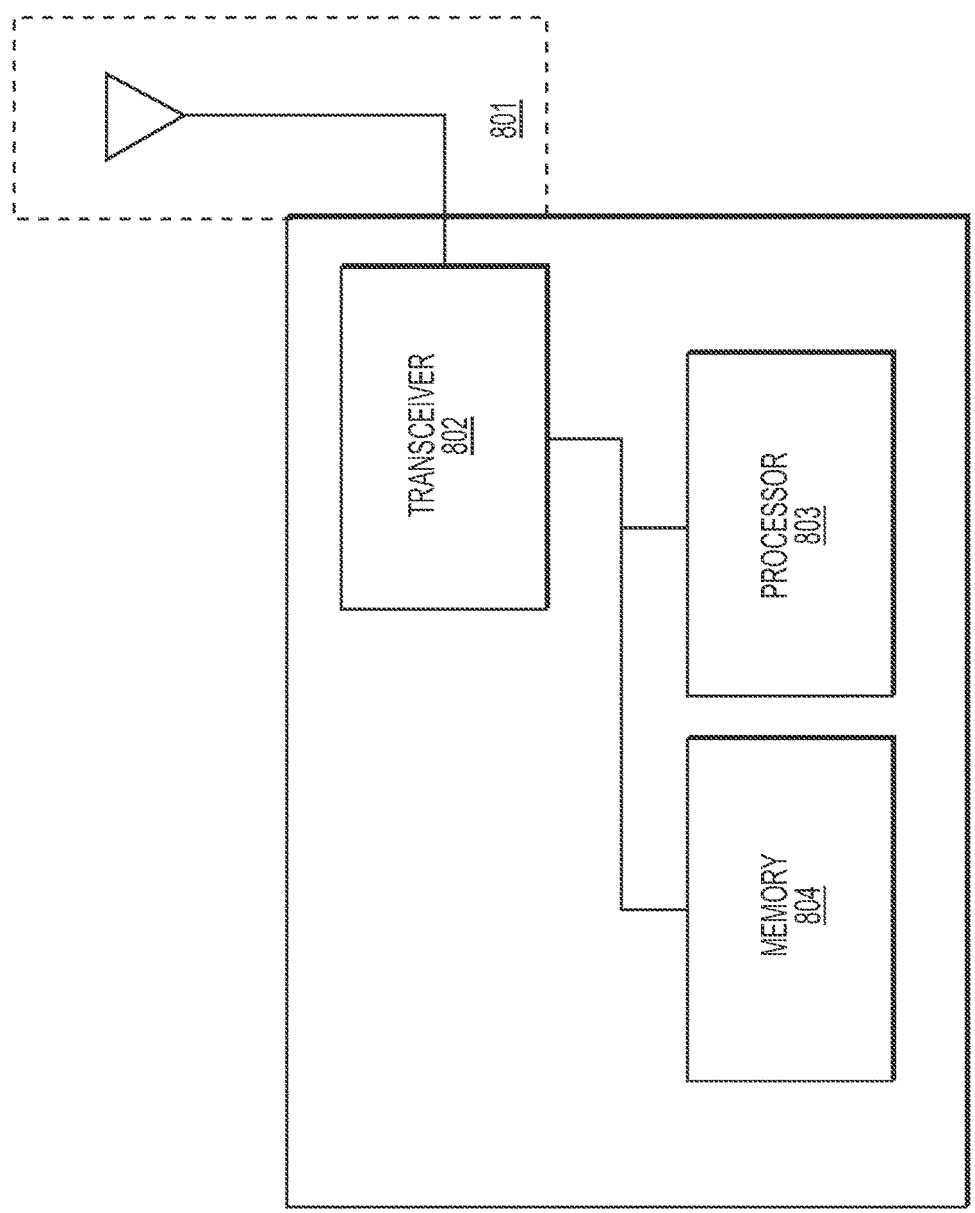
FIG. 8 graphically depicts a block diagram of a wireless local area network (WLAN) apparatus according to an embodiment of the present disclosure.

In another aspect, the present disclosure embraces a wireless local area network (WLAN) apparatus (e.g., gateway, router, repeater, switch, hub, etc.), as shown in FIG. 8. The apparatus includes an antenna subsystem 801 tuned to a radio-frequency (RF) band. The antenna subsystem 801 may include a receiving/radiating element or elements (e.g., elements for beamforming, elements for MIMO, etc.) that may be integrated with the apparatus or attached remotely to the apparatus by a waveguide (e.g., coaxial cable). The antenna subsystem 801 may also include amplification (e.g., cable loss compensation) and circuitry (e.g., impedance matching circuits, harmonic filters, couplers, baluns, power combiners dividers, etc.) to improve the antenna subsystems operation (e.g., efficiency, signal routing, electromagnetic interference, etc.) with other subsystems. The apparatus also includes a transceiver subsystem 802 connected to the antenna subsystem. The transceiver subsystem includes the electronics (e.g., RF amplifier, local oscillator, mixer, IF amplifier, IF filter, demodulator, baseband amplifier, ADC, DAC, etc.) to configure the subsystem to transmit and receive on one (i.e., a first channel) of a plurality of channels in the band. The apparatus also includes a processor (e.g., CPU, multi-core processor, ARM, ASIC, FPGA, etc.) 803 communicatively coupled (e.g., via traces, system on a chip, etc.) to the transceiver subsystem 802. As used herein, processor refers to a physical hardware device that executes encoded instructions for performing functions on inputs and creating outputs. In some embodiments, the processor may include analog-to-digital (ADC) converters (and digital-to-analog (DAC) converters) to communicate in analog with the transceiver. The processor is configured by instructions (e.g., software, firmware, etc.) to perform WLAN operations (i.e., 802.11 communication) and signal discrimination for DFS. The instructions may be stored in a memory 804 communicatively coupled to the processor (e.g., recalled from a non-transitory computer readable storage media).

In one possible embodiment the instructions configure the processor to generate a digital signal by digitizing a signal from the transceiver and then analyze the digital signal to determine whether a portion of the digital signal contains a signal from a radar transmitting on the first channel or noise from a radar transmitting on a channel other than the first channel. Similar to the previous discussion, the analysis of the digital signal includes estimating a center frequency (Fc) of the portion of the digital signal, determining a pulse width, and determining a PSD of the portion of the digital signal. The analysis further includes calculating a SNR of the PSD. The calculation of the SNR may include computing an FFT, determining the power in a signal region and the power in one or more noise regions, and computing the ratio of the signal power to the noise power. The SNR is then compared to an on-channel threshold and a DFS operation to change channels is either performed or not performed based on the comparison.

The analysis of the signal to determine if a signal is from an on-channel source or from an off-channel source may be executed independently or as part of DFS. In other words, the analysis (i.e., discrimination) algorithm may operate independently to control a DFS algorithm, a set of DFS algorithms, or particular operations within a DFS algorithm. In addition, the analysis algorithm may operate in conjunction with other analysis algorithms. For example, a plurality analysis algorithms may processes the received signal to contribute a portion of information used to determine if DFS is required. In this case, the method described herein could return an SNR that when considered along with other metrics returned by other algorithms to determine the probability that the signal is from an on-channel source or an off-channel source. In addition, the analysis of the signal may be repeated (e.g., for multiple pulses) until a statistical model of the SNR is obtained and this statistical model of SNR may be compared to the threshold.

The invention claimed is:

1. A method for discriminating signals for dynamic frequency selection (DFS), the method comprising:
   receiving, using a wireless access point (WAP), a radio-frequency (RF) signal on a first channel;
   determining a signal-to-noise ratio (SNR) of a frequency spectrum derived from a portion of the received RF signal;
   comparing the SNR to an on-channel threshold associated with the first channel, wherein the on-channel threshold facilitates discriminating signals transmitted by RF sources operating on the first channel from signals transmitted by RF sources operating off the first channel; and
   upon determining that the SNR does not exceed the on-channel threshold, preventing the WAP, operating on the first channel, from performing DFS.

2. The method of claim 1, wherein determining a signal-to-noise ratio (SNR) of a frequency spectrum derived from a portion of the received RF signal comprises:
   identifying a pulse within the portion of the received RF signal;
   computing a power spectral density (PSD) of the pulse; and
   determining the SNR of the PSD by relating a signal portion of the PSD and a noise portion of the PSD, wherein the signal portion and the noise portion do not overlap.

3. The method according to claim 2, wherein the signal portion of the PSD contains a center frequency (Fc), wherein Fc is determined by estimating the frequency of the pulse.

4. The method according to claim 2, wherein the signal portion of the PSD corresponds to the signal occupied bandwidth (BW) of the pulse, wherein the BW is determined by estimating the duration of the pulse.

5. The method according to claim 2, wherein the computing a power spectral density (PSD) of the pulse, comprises:
   computing a fast Fourier Transform (FFT) of the pulse, wherein the FFT is comprised of FFT-bins.

6. The method according to claim 5, wherein determining the SNR of the PSD by relating a signal portion of the PSD and a noise portion of the PSD comprises:
   determining an FFT-bin corresponding to an estimated center frequency (Fc) of the pulse and a number of FFT-bins within an estimated signal occupied bandwidth (BW) of the pulse;
   determining, using the FFT-bin corresponding to Fc and the number of FFT-bins within the BW, FFT-bins corresponding to the signal portion and FFT-bins corresponding to the noise portion;
   determining a signal power from the FFT-bins corresponding to the signal portion and a noise power from the FFT-bins corresponding to the noise portion; and
   determining the SNR as the ratio of the signal power to the noise power.

7. The method according to claim 6, wherein the FFT-bin corresponding to the Fc of the pulse is the center FFT-bin in the FFT-bins corresponding to the signal portion.

8. The method according to claim 6, the signal portion spans the number of FFT-bins within the BW of the pulse.

9. The method according to claim 6, wherein determining a signal power using the FFT-bins in the signal portion and a noise power using the FFT-bins in the noise portion comprises:
   summing the FFT-bins in the signal portion of the PSD to determine the signal power, and
   summing the FFT-bins in the noise portion of the PSD to determine the noise power.

10. The method according to claim 1, further comprising:
    retrieving the on-channel threshold from a look-up table, wherein the look-up table comprises a plurality of on-channel thresholds, each indexed by a given center frequency and/or a given signal-occupied bandwidth.

11. The method according to claim 1, further comprising:
    upon determining that the SNR exceeds the on-channel threshold, causing the WAP, operating on the first channel, to perform DFS.

12. The method according to claim 1, wherein performing DFS comprises:
    ceasing the WAP's transmitting/receiving on the channel;
    tuning the WAP to a new channel; and
    resuming the WAP's transmitting/receiving on the new channel.

13. A wireless access point (WAP) with signal discrimination for dynamic frequency selection (DFS), the WAP comprising:
    an antenna subsystem tuned to a radio-frequency (RF) band;
    a transceiver subsystem connected to the antenna subsystem and configured to transmit and receive on a first channel, wherein the first channel is one of a plurality of channels in the RF band; and
    a processor communicatively coupled to the transceiver subsystem and configured by instructions to:
    receive an RF signal on the first channel of the WAP,
    determine a signal-to-noise ratio (SNR) of a frequency spectrum derived from a portion of the received RF signal,
    comparing the SNR to an on-channel threshold associated with the first channel, wherein the on-channel threshold facilitates discriminating signals transmitted by RF sources operating on the first channel from signals transmitted by RF sources operating off the first channel, and
    upon determining that the SNR does not exceed the on-channel threshold, preventing the WAP, operating on the first channel, from performing DFS.

14. The WAP according to claim 13, wherein to determine a signal-to-noise ratio (SNR) of a frequency spectrum derived from a portion of the received RF signal, the processor is configured by instructions to:
    identify a pulse within the portion of the received RF signal;
    compute a power spectral density (PSD) of the pulse; and
    determine the SNR of the PSD by relating a signal portion of the PSD and a noise portion of the PSD, wherein the signal portion and the noise portion do not overlap.

15. The WAP according to claim 14, wherein the signal portion of the PSD contains a center frequency (Fc), wherein Fc is determined by estimating the frequency of the pulse.

16. The WAP according to claim 14, wherein the signal portion of the PSD corresponds to the signal occupied bandwidth (BW) of the pulse, wherein the BW is determined by estimating the duration of the pulse.

17. The WAP according to claim 14, wherein to compute a power spectral density (PSD) of the pulse, the processor is configured by instructions to:
    compute a fast Fourier Transform (FFT) of the pulse, wherein the FFT is comprised of FFT-bins.

18. The WAP according to claim 17, wherein to determine the SNR of the PSD by relating a signal portion of the PSD and a noise portion of the PSD that does not overlap with the signal portion, the processor is configured by instructions to:

determine an FFT-bin corresponding to an estimated center frequency (Fc) of the pulse and a number of FFT-bins within an estimated signal occupied bandwidth (BW) of the pulse;

determine, using the FFT-bin corresponding to Fc and the number of FFT-bins within the BW, FFT-bins corresponding to the signal portion of the PSD and FFT-bins corresponding to the noise portion of the PSD;

determine a signal power from the FFT-bins corresponding to the signal portion and a noise power from the FFT-bins corresponding to the noise portion; and determine the SNR as the ratio of the signal power to the noise power.

19. The WAP according to claim 13, wherein the processor is further configured by instructions to:

upon determining that the SNR exceeds the on-channel threshold, causing the WAP, operating on the first channel, to perform DFS.

20. A non-transitory computer readable storage medium containing computer readable instructions that when executed by a processor of a wireless access point (WAP) cause the processor to perform a method for discriminating signals for dynamic frequency selection (DFS), the method comprising:

receiving a radio-frequency (RF) signal on a first channel of the WAP;

determining a signal-to-noise ratio (SNR) of a frequency spectrum derived from a portion of the received RF signal;

comparing the SNR to an on-channel threshold associated with the first channel, wherein the on-channel threshold facilitates discriminating signals transmitted by RF sources operating on the first channel from signals transmitted by RF sources operating off the first channel; and upon determining that the SNR does not exceed the on-channel threshold, preventing the WAP, operating on the first channel, from performing DFS.

* * * * *